United States Patent
Kagan et al.

(10) Patent No.: US 8,751,909 B2
(45) Date of Patent: *Jun. 10, 2014

(54) PROCESSING OF BLOCK AND TRANSACTION SIGNATURES

(75) Inventors: Michael Kagan, Zichron Yaakov (IL); Noam Bloch, Bat Shlomo (IL); Ariel Shachar, Jerusalem (IL)

(73) Assignee: Mellanox Technologies Ltd., Yokneam (IL)

( * ) Notice: Subject to any disclaimer, the term of this patent is extended or adjusted under 35 U.S.C. 154(b) by 131 days.

This patent is subject to a terminal disclaimer.

(21) Appl. No.: 13/489,474

(22) Filed: Jun. 6, 2012

(65) Prior Publication Data

US 2012/0246535 A1 Sep. 27, 2012

Related U.S. Application Data

(63) Continuation of application No. 12/573,119, filed on Oct. 4, 2009, now Pat. No. 8,225,182.

(51) Int. Cl.
*H03M 13/00* (2006.01)
*G06F 11/00* (2006.01)

(52) U.S. Cl.
USPC .......................... 714/776; 714/774; 714/799

(58) Field of Classification Search
USPC ......................................... 714/774, 776, 799
See application file for complete search history.

(56) References Cited

U.S. PATENT DOCUMENTS

| | | | |
|---|---|---|---|
| 6,289,023 B1 | 9/2001 | Dowling et al. | |
| 6,601,210 B1 | 7/2003 | Kagan | |
| 7,180,887 B1 | 2/2007 | Schwaderer et al. | |
| 7,334,124 B2 | 2/2008 | Pham et al. | |
| 7,349,992 B2 | 3/2008 | Moroney et al. | |
| 7,359,911 B2 | 4/2008 | Underseth | |
| 7,412,475 B1 | 8/2008 | Govindarajalu | |
| 7,447,975 B2 | 11/2008 | Riley | |
| 7,536,593 B2 | 5/2009 | Benhase et al. | |
| 7,594,159 B2 * | 9/2009 | Fujikami et al. | 714/776 |
| 7,636,767 B2 | 12/2009 | Lev-Ran et al. | |

(Continued)

OTHER PUBLICATIONS

Vranken, H.; Hapke, F.; Rogge, S.; Chindamo, D.; Volkerink, E., "Atpg padding and ate vector repeat per port for reducing test data volume," Test Conference, 2003. Proceedings. ITC 2003. International , vol. 1, No., pp. 1069,1078, Sep. 30-Oct. 2, 2003.*

(Continued)

*Primary Examiner* — Cynthia Britt
(74) *Attorney, Agent, or Firm* — D. Kligler I.P Services Ltd.

(57) ABSTRACT

A network communication device includes a host interface, which is coupled to communicate with a host processor, having a host memory, so as to receive a work request to execute a transaction in which a plurality of data blocks are to be transferred over a packet network. Processing circuitry is configured to process multiple data packets so as to execute the transaction, each data packet in the transaction containing a portion of the data blocks, and the multiple data packets including at least first and last packets, which respectively contain the first and last data blocks of the transaction. The processing circuitry is configured to compute a transaction signature over the data blocks while processing the data packets so that at least the first data block passes out of the network communication device through one of the interfaces before computation of the transaction signature is completed.

10 Claims, 6 Drawing Sheets

(56) References Cited

U.S. PATENT DOCUMENTS

| | | |
|---|---|---|
| 7,804,862 B1 | 9/2010 | Olson et al. |
| 7,904,713 B1 | 3/2011 | Zajkowski et al. |
| 7,987,344 B2 | 7/2011 | Hansen et al. |
| 8,225,182 B2 | 7/2012 | Kagan et al. |
| 2004/0153907 A1 | 8/2004 | Gibart |
| 2005/0149817 A1 | 7/2005 | Biran et al. |
| 2006/0015654 A1 | 1/2006 | Krantz et al. |
| 2007/0124415 A1 | 5/2007 | Lev-Ran et al. |
| 2011/0010557 A1 | 1/2011 | Kagan et al. |
| 2011/0029847 A1 | 2/2011 | Goldenberg et al. |

OTHER PUBLICATIONS

Pannetrat, A.; Molva, R., "Authenticating real time packet streams and multicasts," Computers and Communications, 2002. Proceedings. ISCC 2002. Seventh International Symposium on, vol., No., pp. 490,495, 2002.*

Working Draft Project American National Standard T10/1799-D, "Information Technology—SCSI Block Commands—3 (SBC-3)", Revision 19, May 29, 2009.

"Infiniband Architecture: Specification vol. 1", Release 1.2.1, Infiniband Trade Association, Nov. 2007.

"Mellanox ConnectX IB: Dual-Port InfiniBand Adapter Cards with PCI Express 2.0", Mellanox Technologies, USA, 2008.

U.S. Appl. No. 12/498,381 Official Action dated Oct. 27, 2011.

U.S. Appl. No. 12/498,381 Official Action dated Mar. 29, 2012.

U.S. Appl. No. 12/512,026 Official Action dated Jul. 2, 2012.

Mongeau et al., "Ensuring Integrity of Network Inventory and Configuration Data", 11th International Telecommunications Network Strategy and Planning Symposium (Networks 2004), pp. 267-272, Jun. 13-16, 2004.

Gavidia et al., "Enforcing Data Integrity in Very large Ad Hoc Networks", 2007 International Conference on Mobile Data Management, pp. 77-85, May 1, 2007.

U.S. Appl. No. 12/498,381 Advisory Action dated Jun. 19, 2012.

Chinese Patent Application # 201010505279.0. Office Action dated Nov. 25, 2013.

* cited by examiner

PROCESSING OF BLOCK AND TRANSACTION SIGNATURES

CROSS-REFERENCE TO RELATED APPLICATION

The application is a continuation of U.S. patent application Ser. No. 12/573,119, filed Oct. 4, 2009, which is incorporated herein by reference.

FIELD OF THE INVENTION

The present invention relates generally to computer networks, and specifically to computing, protecting and verifying data integrity in computer networks, including particularly storage networks.

BACKGROUND OF THE INVENTION

A block signature (also called a data integrity field or DIF) is commonly added to a block (also referred to a segment) of data in order to protect against data errors, particularly (but not exclusively) in data storage applications. For example, the T10 Technical Committee of the InterNational Committee for Information Technology Standards (INCITS), which is responsible for standardization of the Small Computer System Interface (SCSI) storage protocol, has standardized the use of a DIF to support end-to-end data protection in storage networks. This DIF is appended to each SCSI data block (also referred to as a sector and typically, although not necessarily, 512 bytes in size). It comprises eight bytes including a 16-bit "Block Guard" cyclic redundancy code (CRC), a 16-bit "Application Tag," and a 32-bit "Reference Tag," which is incremented to ensure that blocks are maintained in the proper order.

The SCSI DIF is just one well-known type of data integrity field, and many other examples exist. In the context of the present patent application and in the claims, the term "signature" should be understood as referring generally to any data field that is computed over and associated with certain data, such as a data block, and can then be used in verifying that the data has not been corrupted. The signature can either be appended to its associated data, or stored in another location. Verifying a signature (for example, when reading a data block) ensures that that the data was not altered since the signature was calculated.

InfiniBand™ (IB) is a switched-fabric communications link primarily used in high-performance computing. It has been standardized by the InfiniBand Trade Association. Computing devices (host processors and peripherals) connect to the IB fabric via a network interface adapter, which is referred to in IB parlance as a channel adapter. Host processors (or hosts) use a host channel adapter (HCA), while peripheral devices use a target channel adapter (TCA).

SUMMARY OF THE INVENTION

An embodiment of the present invention provides a network communication device, including a host interface, which is coupled to communicate with a host processor, having a host memory, so as to receive a work request to execute a transaction in which a plurality of data blocks, including at least first and last data blocks, are to be transferred over a packet network. A network interface is coupled to the packet network. Processing circuitry is configured to process multiple data packets so as to execute the transaction, each data packet in the transaction containing a portion of the data blocks, and the multiple data packets including at least first and last packets, which respectively contain the first and last data blocks of the transaction, and is configured to compute a transaction signature over the data blocks while processing the data packets so that at least the first data block passes out of the network communication device through one of the interfaces before computation of the transaction signature is completed.

In a disclosed embodiment, the processing circuitry is configured to compute respective block signatures of the data blocks, and to insert the block signatures in the data packets. The block signatures for source data in the transaction may be heterogeneous (i.e., there may be different block signature calculations for different data blocks in the transaction).

In some embodiments, in addition to calculating the block signatures, the processing circuitry is configured to read the data blocks from the host memory, to generate the multiple data packets, and to compute and insert the transaction signature in the last data packet, while transmitting at least the first data packet through the network interface before the computation of the transaction signature is completed. Additionally or alternatively, the processing circuitry is configured to receive the data packets from the network interface, and to compute the transaction signature while transferring the data blocks to the host memory so that at least the first data block is written to the host memory before the computation of the transaction signature is completed.

In some embodiments, the data blocks are received by the processing circuitry with a first transaction signature, and the processing circuitry is configured to remove, read and verify the first transaction signature and to compute and append a second transaction signature, different from the first signature, to the data blocks. Typically, the processing circuitry is configured to convey a completion report to the host processor after processing the multiple data packets, and to insert an error indication in the completion report upon discovering an error in verification of the first signature.

In disclosed embodiments, the device includes a control memory, which is configured to store a signature context, wherein the processing circuitry is configured to read and apply the signature context in order to compute the transaction signature. The processing circuitry may be configured to store in the control memory an interim transaction signature result computed over at least the first packet and to read and use the interim transaction signature result in completing the computation of the transaction signature on the last packet.

There is also provided, in accordance with an embodiment of the present invention, a network communication device, including a host interface, which is coupled to communicate with a host processor, having a host memory, so as to receive a work request to execute a transaction in which one or more data blocks are to be transferred over a packet network. A network interface is coupled to the packet network. Processing circuitry is configured to process one or more data packets containing the one or more data blocks so as to execute the transaction, and is configured to read and verify a first signature received with the one or more data blocks through one of the host and network interfaces, and to compute a second signature, different from the first signature, over the one or more data blocks, and to convey the second signature with the one or more data blocks through the other of the host and network interfaces.

The first and second signatures may include block signatures, which are computed over each of the data blocks, and/or transaction signatures, which are computed over a plurality of the data blocks.

There is additionally provided, in accordance with an embodiment of the present invention, a network communication device, including a host interface, which is coupled to communicate with a host processor, having a host memory, so as to receive a work request to execute a transaction in which one or more data blocks are to be transferred over a packet network. A network interface is coupled to the packet network. A control memory is configured to store a signature context. Processing circuitry is configured to process one or more data packets containing the one or more data blocks so as to execute the transaction, and is configured to read the signature context from the control memory, and to apply the signature context in computing a signature over one or more of the data blocks.

In some embodiments, the signature context indicates a rule to be applied by the processing circuitry in computing the signature. Typically, the one or more data blocks include at least first and second data blocks, and the control memory is configured to store multiple signature contexts, including at least first and second signature contexts, which include different rules for signature computation to be applied respectively by the processing circuitry to the first and second data blocks.

In a disclosed embodiment, the work request includes a memory key that is associated with the data blocks and indicates a location in the host memory, and the memory key includes a pointer to the signature context for use by the processing circuitry in reading the signature context.

In some embodiments, the signature context includes a block signature context, which is applied by the processing circuitry in computing a block signature over at least one of the data blocks. The transaction may include multiple, heterogeneous data blocks, having different, respective block signature contexts. Additionally or alternatively, the signature context may include a transaction signature context, which is applied by the processing circuitry in computing a transaction signature over the data blocks in the transaction.

There is further provided, in accordance with an embodiment of the present invention, a method for communication, including receiving a work request from a host processor, having a host memory, to execute a transaction in which a plurality of data blocks, including at least first and last blocks, are to be transferred over a packet network via a network interface device. In the network interface device, multiple data packets are processed so as to execute the transaction, each data packet in the transaction containing a portion of the data blocks, and the multiple data packets including at least first and last packets, which respectively contain the first and last data blocks of the transaction. A transaction signature is computed over the data blocks while processing the data packets so that at least the first data block passes out of the network communication device through an interface before computation of the transaction signature is completed.

There is moreover provided, in accordance with an embodiment of the present invention, a method for communication, including receiving a work request from a host processor, having a host memory, to execute a transaction in which one or more data blocks are to be transferred over a packet network via a network interface device having a host interface and a network interface. In the network interface device, one or more data packets containing the one or more data blocks are processed so as to execute the transaction. A first signature received by the network interface device with the one or more data blocks through one of the host and network interfaces is read and verified. A second signature, different from the first signature, is computed over the one or more data blocks. The second signature is conveyed with the one or more data blocks from the network interface device through the other of the host and network interfaces.

There is furthermore provided, in accordance with an embodiment of the present invention, a method for communication, including receiving a work request from a host processor, having a host memory, to execute a transaction in which one or more data blocks are to be transferred over a packet network via a network interface device having a control memory. A signature context is stored in the control memory. One or more data packets containing the one or more data blocks are processed so as to execute the transaction. A signature is computed over one or more of the data blocks, using the signature context that is stored in the control memory.

BRIEF DESCRIPTION OF THE DRAWINGS

The invention is herein described, by way of example only, with reference to the accompanying drawings, wherein.

DETAILED DESCRIPTION OF EMBODIMENTS

The following notation is used throughout the document:

| Term | Definition |
| --- | --- |
| BSC | Block Signature Context |
| CPU | Central Processing Unit |
| CRC | Cyclic Redundancy Check |
| DIF | Data Integrity Field |
| FCP | Fibre Channel Protocol |
| HCA | Host Channel Adapter |
| I/O | Input/Output |
| IB | InfiniBand ™ |
| LAN | Local Area Network |
| RDMA | Remote Direct Memory Access |
| S/G | Scatter/Gather |
| SAN | Storage Area Network |
| SCSI | Small Computer Storage Interface |
| TCA | Target Channel Adapter |
| TSC | Transaction Signature Context |
| WAN | Wide Area Network |

Overview

When a computer application generates or receives a work request to transfer one or more data blocks over a network, it is frequently necessary to compute and/or verify signatures over the blocks. The work request typically specifies a host memory region of a specific data size where the data to be transferred is stored. There may be a block signature associated with each of the data blocks.

In addition, a transaction signature may be used to verify all the data in the transaction. The term "transaction," as used in the context of the present patent application and in the claims, refers to a group of data blocks that constitute a single data structure. Typically, although not necessarily, a transaction is invoked by a higher-level application or protocol and involves a transfer of one or more data blocks in response to a work request to convey the data blocks over a network. The data blocks may be transferred together in a single packet or spread over two or more packets. In some instances, transaction data may be transferred using multiple I/O operations.

In embodiments of the present invention, transaction and block signatures are either (1) verified (i.e., a source data signature is checked), (2) appended (i.e., a destination data signature is added to data), or (3) verified and appended (as in a signature handover, discussed hereinbelow) by a network communication device, such as a HCA or other network interface adapter. A transaction signature may be computed and appended to the blocks of data over the entire transaction, while individual block signatures may be appended to the data blocks in the transaction.

Input/output (I/O) data transfer operations are used to move data directly from the memory of one computer to another, across a network without involving the computer operating system(s). Examples of I/O data transfer operations include remote direct memory access (RDMA) operations in InfiniBand (IB) and Ethernet networks and I/O read and write operations in Fibre Channel networks.

I/O data transfer operations are supported by hardware in some network interface adapters, such as the ConnectX™ HCA offered by Mellanox® Technologies (Sunnyvale, Calif.). The channel adapter is thus able to perform I/O data transfer operations at very high speed while relieving the host processor of the burden of communication transport. Although designed to meet IB specifications, the ConnectX HCA also offers an Ethernet link interface, which enables it to transmit and receive Ethernet, as well as IB, packets, and can also be configured to support the Fibre Channel Protocol (FCP). The terms "channel adapter" and "HCA," as used in the present patent application and in the claims, should thus be understood as referring generally to network interface devices that implement I/O data transfer functions in hardware, unless specified otherwise. Although some embodiments described below refer specifically to RDMA, the principles of the present invention may similarly be applied to other I/O data transfer protocols.

In embodiments of the present invention that are described hereinbelow, block and transaction signature-related operations are offloaded from the host processor to dedicated circuitry in a channel adapter, which links the host processor to a network. Specifically, in some embodiments, signature handling is integrated with RDMA and/or other I/O data transfer functions in the channel adapter. The channel adapter is configured to permit transparent communications between an initiator (i.e., the host computer application that initiates a data transfer) and the target regardless of whether or not one or both of them (or neither of them) support and store block and transaction signatures. As part of the I/O data transfer operation, the channel adapter will automatically add or strip the signature as needed, and may also validate the signature if required.

In some embodiments of the present invention, I/O data transfers are invoked by work requests that specify a memory region containing the data to be transferred. Signature context information associated with the memory region includes rules, which indicate to the channel adapter, at the time of execution of the I/O data transfer operation, what signature operations are required.

In some embodiments of the present invention, the HCA calculates a transaction signature incrementally, as it processes the data blocks sequentially in order to generate packets for output to the network or receive packets from the network for input to the host memory. As each data block is processed, the HCA updates the interim value of the transaction signature and may also calculate its block signature. The transaction and/or block signatures may be verified at the same time against previous values that were stored in memory or contained with the data blocks in incoming data packets. The transaction signature calculation is completed upon processing the final data block in the transaction.

Typically, the HCA computes signatures on the fly, without storing the data blocks in its own memory. For multi-packet transactions, the HCA stores the interim (partial) signature values in the transaction signature context until the computation is completed on the last packet. As a result, the first data block in a given transaction may be passed out of the HCA through the host or network interface (depending on whether it is an incoming or outgoing data transaction) before the signature computation has been completed on the last data block. For outgoing transactions, this feature means that the first data packet in the transaction may be transmitted to the network before the transaction signature is computed and inserted into the last packet for transmission. For incoming transactions, the data blocks from the first data packet will have been passed by the HCA to the host memory before the transaction signature in the last data packet has been received and verified.

In case of verification failure, the HCA will insert an error indication in a completion report that it passes to the host processor to report completion of the transaction. The HCA will also append a "bad" signature (i.e., a signature which will fail verification at the destination) to its associated data block, thereby ensuring that any subsequent signature verification process for that data block will fail so that the application software receiving the data will recognize the error that has occurred. For example, the HCA can "seal" each failed block signature with a specific function (e.g., a bitwise NOT of the calculated signature), thereby enabling identification of erroneous data blocks at the destination.

Some work requests involve transferring multiple data blocks between a source and a destination that use different block signatures and/or different transaction signatures. For example, one type of signature may be associated with a given data block or transaction in host memory, while a different type of signature accompanies the data in transmission over a network. As another example, a storage server may receive data from a client on a source network, such as a LAN, using one type of signature, and may transmit the data over a destination network to a storage target on a destination network, such as a SAN, with a different type of signature. In some embodiments of the present invention, a host channel adapter executes a "signature handover" by first verifying the source block and/or transaction signatures over the data blocks in the transaction. The host channel adapter removes these original signatures and calculates destination block and/or transaction signatures. These signatures are then transmitted to the transaction destination, along with the data blocks.

In some embodiments of the present invention a signature context table is stored in a control memory of the host channel adapter. The signature context table stores signature calculation rules for each data block and transaction over which the HCA is to compute a signature. This use of signature contexts enables the HCA to apply different types of signatures to different data blocks and transactions. It thus facilitates signature handovers, as discussed hereinabove, and enables the host channel adapter to process heterogeneous transactions, in which different data blocks have different types of block signatures.

System Description

Figure 1:
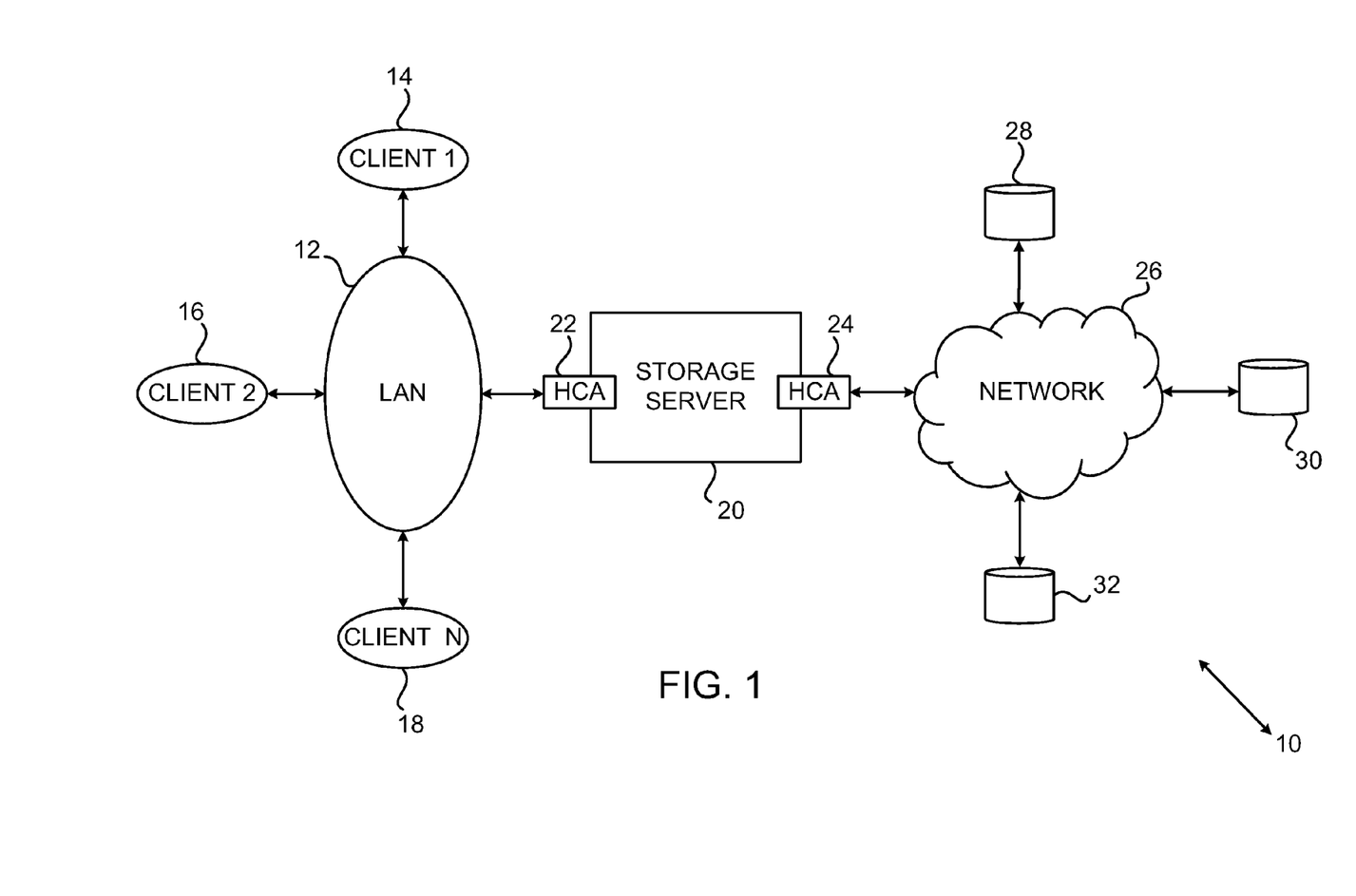
FIG. 1 is a block diagram that schematically shows a wide area network operative to execute a signature handover, in accordance with an embodiment of the present invention.

FIG. 1 is a block diagram that schematically shows a system 10 operative to execute a signature handover, in accordance with an embodiment of the present invention. One of clients 14, 16, 18 on a LAN 12 issues a work request to transfer one or more data blocks to one or more of memory storage devices 28, 30, 32 on a network 26. LAN 12 and network 26 are each packet networks, such as an IB switched fabric communications network, but the different clients and networks may use different types of signatures. For example, client 14 may use a checksum to protect data blocks, while client 16 uses a XOR function, and client 18 uses no block signatures at all. Storage devices 28, 30, 32 may use a SCSI DIF as a block signature, while multi-block transactions are protected with a 32-bit CRC.

In this example, data blocks from multiple clients on network 12 are combined by a storage server 20 in a single transaction for storage on one of the storage devices. Thus, the transaction will include multiple data blocks with different (heterogeneous) block signatures. The data blocks are transferred from the clients to storage server 20 via a HCA 22, which verifies the block signatures for the data blocks in the transaction and may store the blocks temporarily in the server memory. While the data blocks may include heterogeneous block signatures, HCA 22 typically stores the data blocks on storage server 20 (or any other destination storage device) with homogeneous block signatures relevant for the destination. In another scenario, data is transferred from storage server 20 to the clients via HCA 22 (i.e., embodiments of the present invention may include both disk read and disk write operations through HCA 22).

For simplicity and convenience in the description that follows, the components of system 10 are shown and described, by way of example, in terms of InfiniBand networks and HCAs. In alternative embodiments of the present invention, however, the methods of signature processing that are described in this patent application can be implemented in other types of network communication devices, supporting other network standards, including Fibre Channel and Ethernet.

For each incoming data block, HCA 22 applies the appropriate type of signature calculation, in accordance with a respective signature context, as described in greater detail hereinbelow. HCA 22 may also calculate a transaction signature over the entire sequence of data blocks, and may store the block and/or transaction signatures in the memory of server 20.

Server 20 then transfers the data blocks in a single transaction to one of storage devices 28, 30, 32 over network 26 via another HCA 24. As it processes the outgoing data blocks for insertion into packets to be transmitted over network 26, HCA 24 calculates and verifies the transaction and block signatures that were stored with the data by HCA 22. This on-the-fly calculation of the signatures is useful in detecting and preventing data errors that may have occurred due to silent data corruption in the server memory. The transaction may extend over multiple data packets, each containing a portion of the data blocks.

While generating the outgoing data packets, HCA 24 performs a signature handover by calculating and inserting new block and transaction signatures into the outgoing packets for transmission over network 26. If necessary, HCA 24 may break the data into blocks of different size from those received from clients 14, 16, 18, and will then compute the block signatures for these new blocks. In contrast to the heterogeneous data blocks that were received and stored by server 20, the data blocks in the packets transmitted in the transaction over network 26 may be homogeneous, with constant block size and the same type of signature on all blocks. Alternatively HCA 22 can perform the signature handover, while HCA 24 simply verifies the signatures as the data blocks are transferred to network 26.

Figure 2:
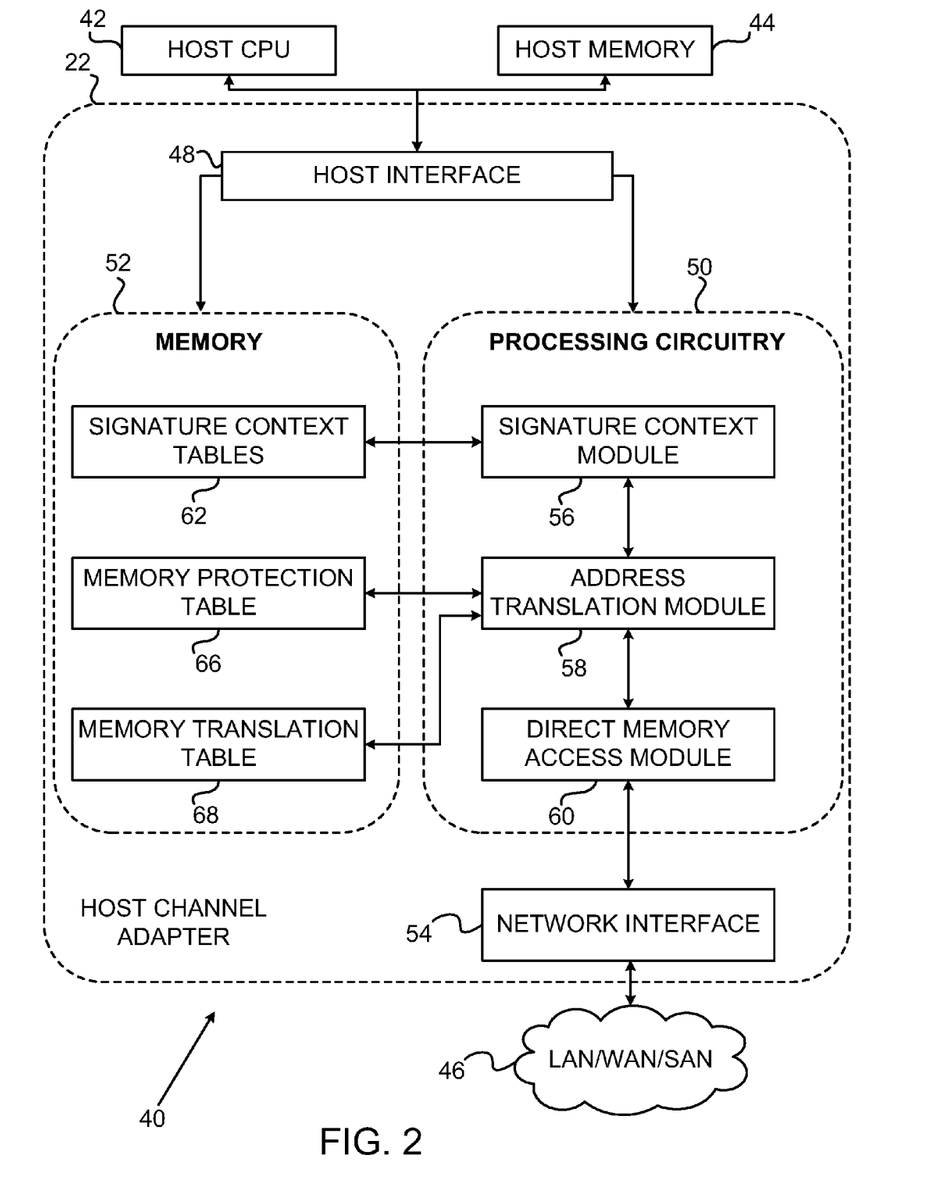
FIG. 2 is a block diagram that schematically illustrates functional components of a host channel adapter that calculates signatures, in accordance with an embodiment of the present invention.

FIG. 2 is a block diagram 40 that schematically illustrates functional components of HCA 22 that are involved in calculation of signatures, in accordance with an embodiment of the present invention. (The structure of HCA 24 would be similar.) In this example, HCA 22 receives a work request, such as a RDMA request, from a host CPU 42 to carry out a transaction involving transfer of one or more data blocks from a host memory 44 to a network 46 (such as a LAN, WAN, SAN, or other switched fabric). The structure of HCA 22 that is shown and described here is highly simplified to include only those elements that are necessary for an understanding of how the signature processing functions of the HCA may be implemented. This implementation is described only by way of example; alternative implementations will be apparent to those skilled in the art and are considered to be within the scope of the present invention.

Processing circuitry 50 uses information stored in a control memory 52 to access the data and to calculate block and transaction signatures for the data blocks that are to be transferred. In the embodiment shown in FIG. 2, control memory 52 is held in a cache in the HCA device. Alternatively or additionally, the contents of the control memory may be stored in host memory 44 or in a separate memory module (not shown) coupled to HCA 22. Typically, the work request identifies a region in host memory 44 from which the data is to be transferred and provides one or more memory keys to be used by HCA 22 in accessing the data. An address translation module 58 uses the memory keys to look up memory protection and address translation parameters in a memory protection table 66 and a memory translation table 68. The address translation module uses the memory translation information to translate virtual addresses in the work request to corresponding physical addresses in host memory 44.

A direct memory access (DMA) module 60 reads the data blocks from memory 44 via a host interface 48, and inserts the data into one or more data packets for transmission via a network interface 54 over network 46 in order to fulfill the work request. These data transfer operations are carried out on the fly, without storing the data in HCA 22. When a transaction is spread over two or more data packets, it commonly occurs that the first data packet is transmitted out through network interface 54 before processing circuitry 50 has finished assembling the subsequent data packets (and certainly the last data packet) in the transaction.

As noted above, each of the data blocks is associated with a memory key. Each block may have its own key, or a key may be shared by multiple blocks or even the entire transaction. The memory key is a data structure, which contains pointers to entries in the memory protection and translation tables, as noted above. The memory key may also include a pointer to an entry in a signature context table 62. The contents of this table are described in greater detail below. Briefly put, table 62 may comprise a signature context table, which contains rules for computation of the block and transaction signatures for the data block or blocks in question. Additionally or alternatively, signature context table 62 may contain interim values for computation of the transaction signature. Control memory 52 may be configured as a cache for context information that is currently in use by HCA 22, while signature context information (and other types of context information) that has not been used recently is saved in host memory 44 and recalled to control memory 52 when needed.

Address translation module 58 passes the signature context table pointer to a signature context module 56, which uses the pointer to access table 62. The signature context module calculates the block and transaction signatures that are associated with the data blocks received via host interface 48. Module 56 can use these calculations both to verify the signatures that have been stored with the data blocks in memory 44 and to calculate new signatures for insertion in the packets to be transmitted through network interface 54. Thus, in a signature handover, for example, module 56 may perform two different signature calculations—one for verification and the other for new signature insertion—over a given data block and/or transaction. These signature calculations take place on the fly, in the process of constructing data packets in circuitry 50. When a transaction includes multiple packets, computation of the transaction signature can be completed only when the final packet is processed, and interim values of the transaction signature, computed over the preceding packets in the transaction, may be held meanwhile in signature context table 62.

A similar sort of flow occurs when HCA 22 receives the data packets of an incoming transaction from network 46. In this case, DMA module 60 writes the data blocks from the incoming packets to addresses in host memory 44 that are provided by address translation module 58. Signature context module 56 verifies and computes block and transaction signatures, using the information in signature context table 62, wherein the computed signatures may be written to memory 44 together with the data.

Figure 3:
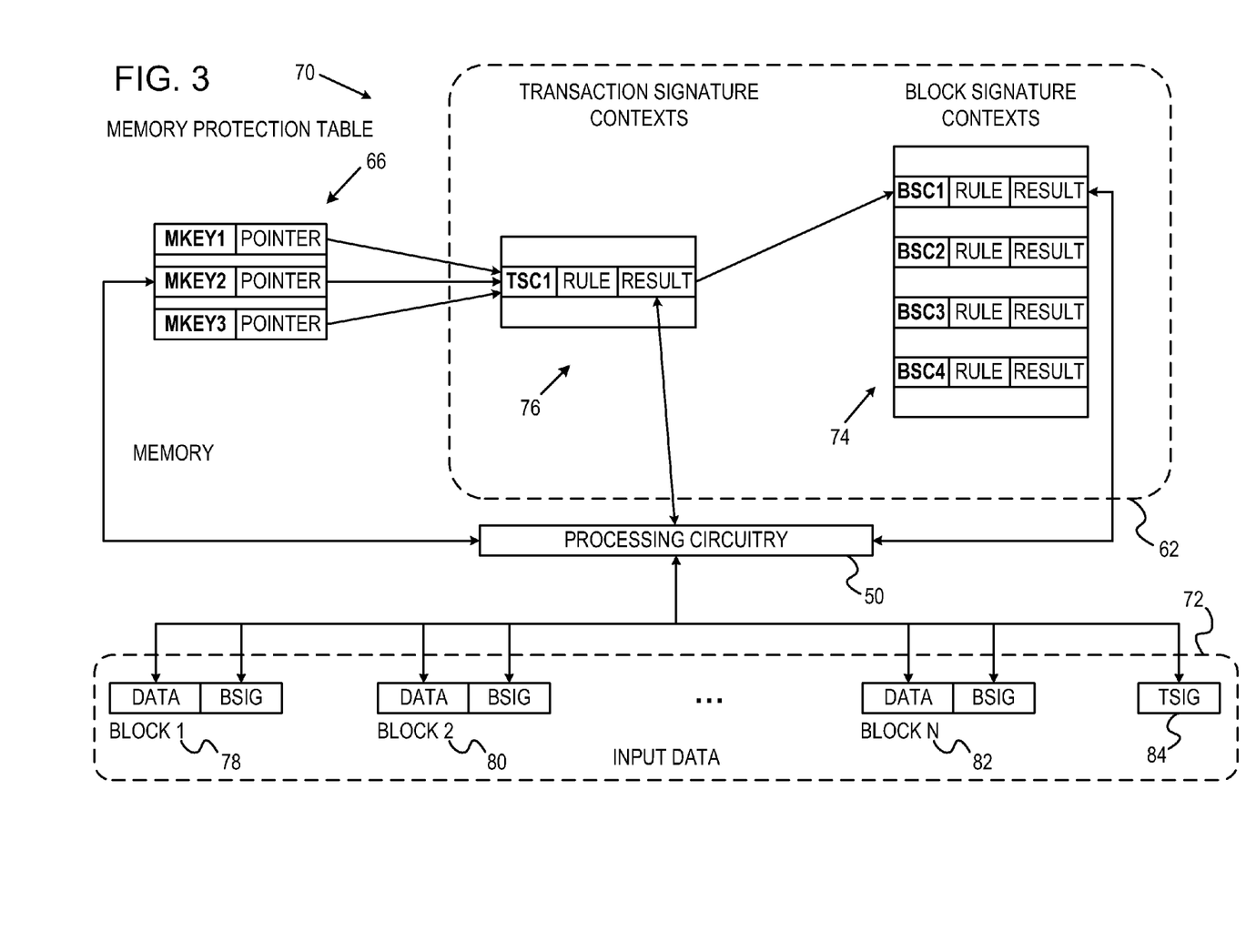
FIG. 3 is a block diagram that schematically illustrates data structures used in signature processing, in accordance with an embodiment of the present invention.

FIG. 3 is a block diagram 70 that schematically illustrates the interaction between a set of input data 72, processing circuitry 50, memory protection table 66 and signature context table 62, in accordance with an embodiment of the present invention. Input data 72 comprises data blocks 78, 80, 82 and a transaction signature 84. Each of data blocks 78, 80, 82 has a block signature (BSIG), as well as data. Each entry in memory protection table 66 comprises a memory key identifier (MKEY#) and a pointer to a corresponding entry in a signature context table 62.

Each of transaction signature contexts 76 in signature context table 62 comprises a transaction signature identifier (TSC#), a transaction signature rule, and a transaction signature result. Each of the block signature contexts 74 comprises a block signature identifier (BSC#), a block signature rule, and a block signature result. Although transaction signature contexts 76 and block signature contexts 74 are shown in FIG. 3 as separate entities, these data structures may conveniently be held together in a single signature context table, in which the transaction signature context is followed by associated block signature contexts.

In other words, for each data block to be transferred, the associated memory key may indicate the transaction signature context to be used for the transaction in which the block or blocks are contained, and the transaction signature context is followed by the block signature context to be used for signature calculations over the block or blocks associated with that key. A transaction signature context may be followed by more than one block signature context. Therefore, as shown in FIG. 3, if a transaction contains heterogeneous blocks, the transaction signature context can be followed by the respective (i.e., multiple) block signature contexts. On the other hand, circuitry 50 may carry out certain transactions without signature computation, in which case the corresponding memory keys may have a null signature context pointer.

In signature context table 62, transaction signature contexts 76 store signature operation parameters for transaction level signatures, and block signature contexts 74 store signature operation parameters for block level signatures. Prior to executing a transaction, application software sets up the TSC entry and any necessary BSC entries in signature context table 62 to be used for the transaction. Transaction signature contexts 76 specify transaction signature rules, and may also specify block level signature rules in homogeneous protection domains. Furthermore, when a signature handover is to be carried out in a given transaction, signature context table 62 for the transaction may specify both the source signature context (to be used in signature verification) and the destination signature context (to be used in computing the new signature) for each block.

In some embodiments of the present invention, data in host memory 44 is referenced using scatter/gather pointers. Each pointer contains the memory key to be used for address translation (that can be associated with a TSC), the address pointer within the address space identified by the memory key, and the length of the data operand (i.e., a byte count). The byte count specifies the number of bytes to be transmitted over network 46. HCA 22 calculates a byte count for memory access based on the byte count specified in the S/G entry, the associated signature context (i.e., BCS or TSC) and the signature operation being executed.

Details of Data Structures

Referring back to FIG. 3, entries in signature context table 62 are associated with blocks of input data 70 via a memory key, which is used to address data residing in host memory 44 that is participating in the transaction. Types of memory keys include:

1. Data memory key. This is a "classic" memory key, without any link to signature context.
2. Signature context memory key. This memory key is associated with an entry in signature context table 62.

Multiple memory keys (such as MKEY1, MKEY2 and MKEY3 in FIG. 3) can be associated with a single entry in signature context table 62. In addition, multiple BSCs can be associated with a single TSC entry in signature context table 62. For a transaction signature, the signature context contains parameters that are maintained throughout the entire transaction, as well as the signature rule of the transaction signature. (The signature rule may indicate whether or not a signature is required altogether.)

Figure 4:
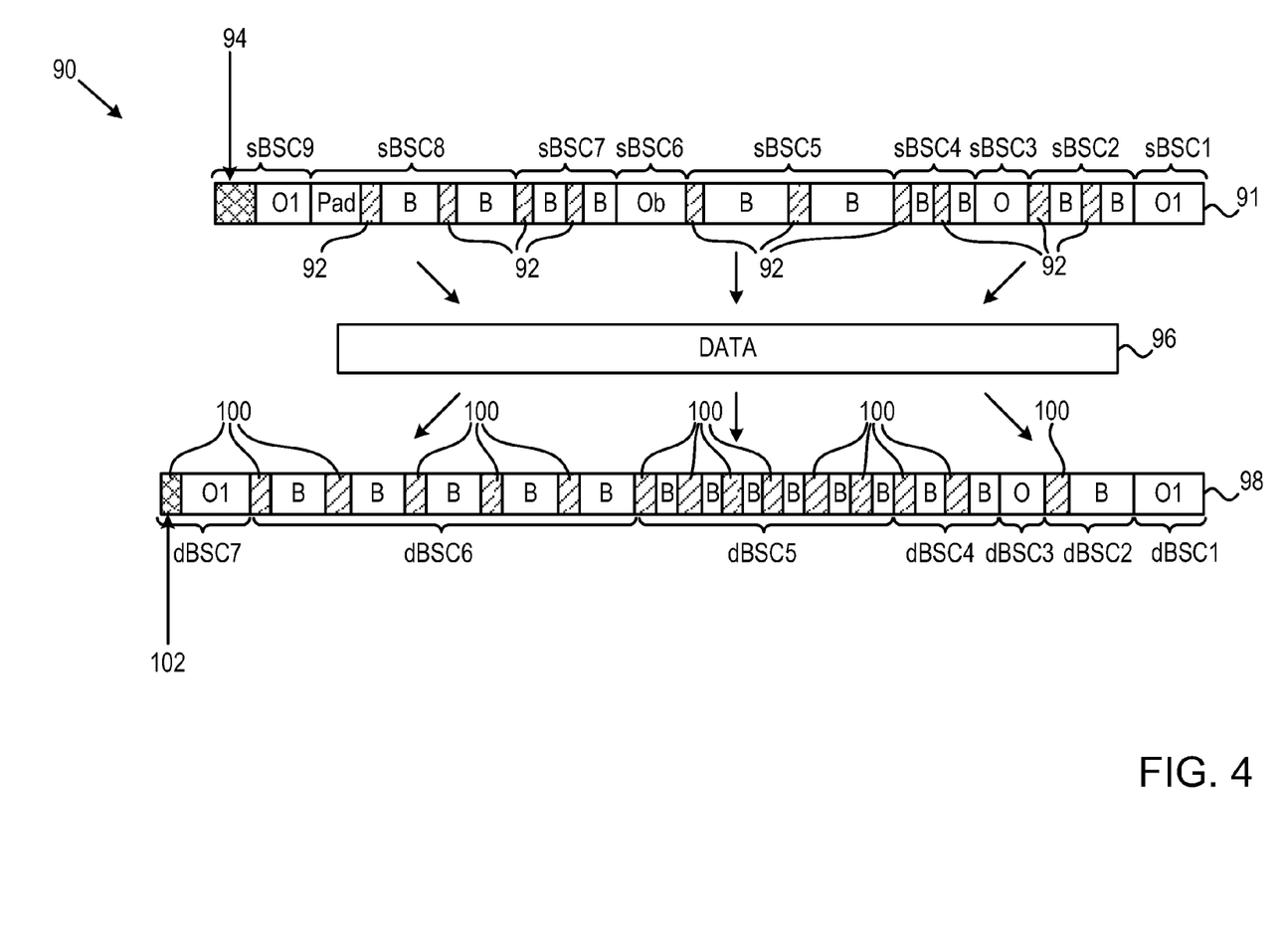
FIG. 4 is a block diagram that schematically illustrates elements of a data transaction, in accordance with an embodiment of the present invention.

FIG. 4 is a block diagram that schematically illustrates the association between data, BSCs and TSCs, for a data transfer transaction 90 with signature handover, from a source data stream 91 to a destination data stream 98, in accordance with an embodiment of the present invention. The diagram illustrates many of the possible cases of association between the data structures of the transaction and various signature rules.

Data segments in transaction 90 are labeled either "B", "O" or "Pad", wherein "B" indicates a data segment comprising one or more signature protected data blocks, and "O" (i.e., "O", "O1" or "Ob") indicates a data segment comprising opaque data blocks, i.e., blocks that do not have block signature (although they may be covered by the transaction signature). "Pad" indicates padding that is added in the source protection domain to complement the segment to fit in the necessary integer number of blocks in destination data stream 98. Generally, the padding comprises signature-invariant data in destination data 98 (e.g., zeros for XOR or checksum).

The signature handover in transaction 90 should be viewed as two independent steps. In the first step, signature context module 56 verifies source block signatures 92 and a source transaction signature 94 from source data 91, as specified in their respective signature contexts. This first step results in a signature-free data stream 96, which is an input to the second step of signature handover transaction 90. In the second step, signature context module 56 calculates destination block signatures 100 and transaction signature 102, which processing circuitry 50 then appends to destination data 98, as specified in their respective signature contexts.

Although the two steps in the signature handover are typically executed in pipeline (i.e., signature-free data is not stored prior to generating output data structures), these two steps should be viewed as independent.

Each data segment (of one or more blocks) in source data stream 91 (or in any data segment in a source data stream) is associated with a designated source BSC (sBSC#), and each segment in destination data stream 98 (or in any data segment in a destination data stream) is associated with a designated BSC (dBSC#). The data in signature handover 90 is heterogeneous, i.e., there are multiple block signatures associated with the data segments making up the transaction. (In scenarios in which the data in signature handover 90 is homogeneous, there would be a single BSC associated with the data blocks making up the transaction.)

Signature Processing

Figure 5:
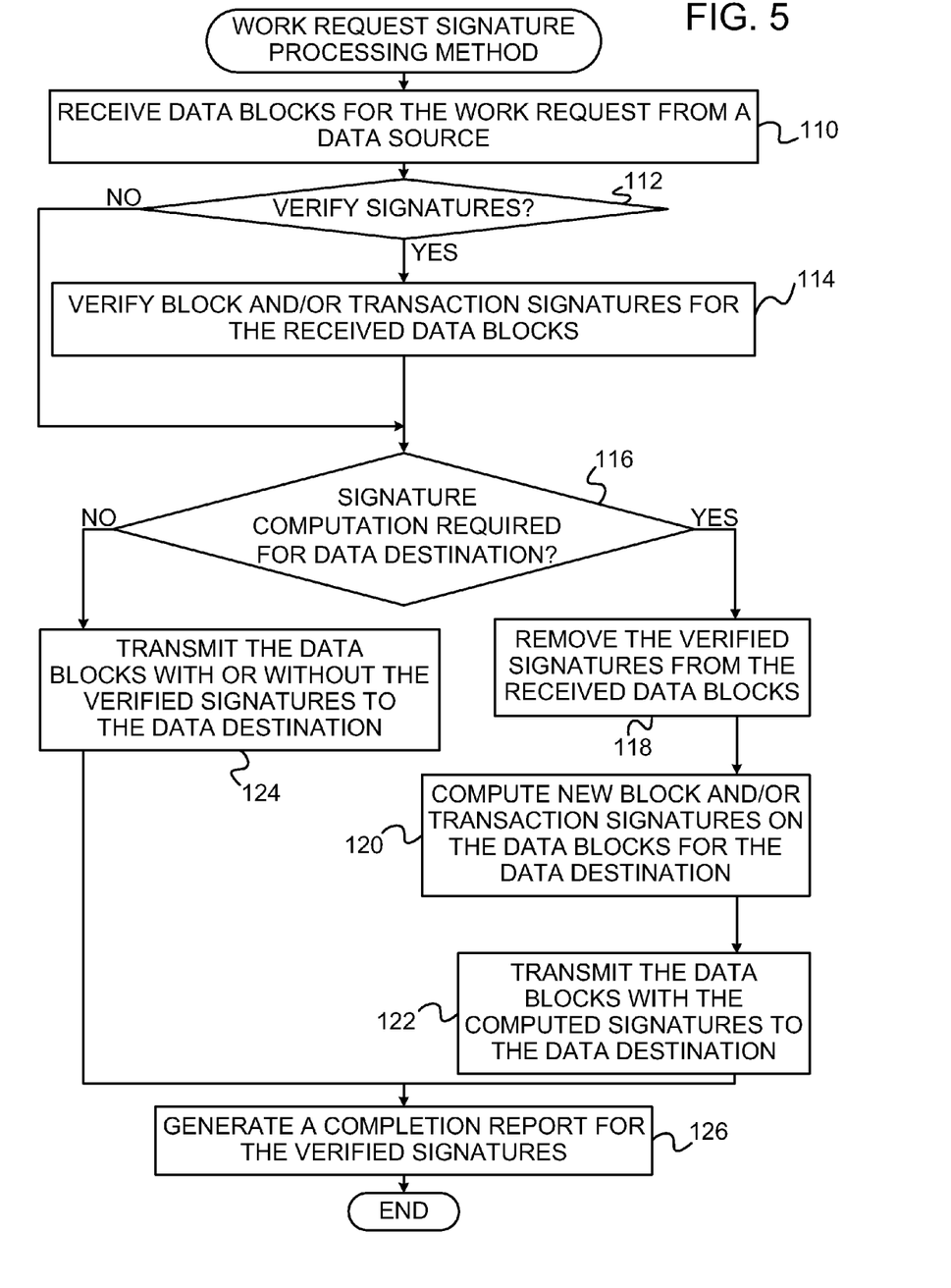
FIG. 5 is a flow diagram that schematically illustrates a work request signature processing method, in accordance with an embodiment of the present invention.

FIG. 5 is a flow diagram that schematically illustrates a work request signature processing method, in accordance with an embodiment of the present invention. The method is described here, for the sake of clarity, with reference to the functional blocks and data structures shown in the preceding figures, although it may alternatively be implemented using other circuits and data structures, as will be apparent to those skilled in the art. It will be assumed in this description that the work request involves an outgoing transfer of data from host memory 44 to network 46, but the method may similarly be applied, mutatis mutandis, to incoming transfers of data from the network to the host memory.

DMA module 60 retrieves data blocks (i.e., the data to be transferred in the transaction) from the physical memory address provided by address translation module 58 in host memory 44, via host interface 48 (step 110). Signature context module 56 retrieves and checks the appropriate block and/or transaction context and determines whether it is necessary to verify the block and/or transaction signatures for the retrieved data blocks (step 112). If so, the signature context module computes the signatures of the blocks and/or transaction and verifies the results against the signatures that were stored in memory (step 114).

Figure 6:
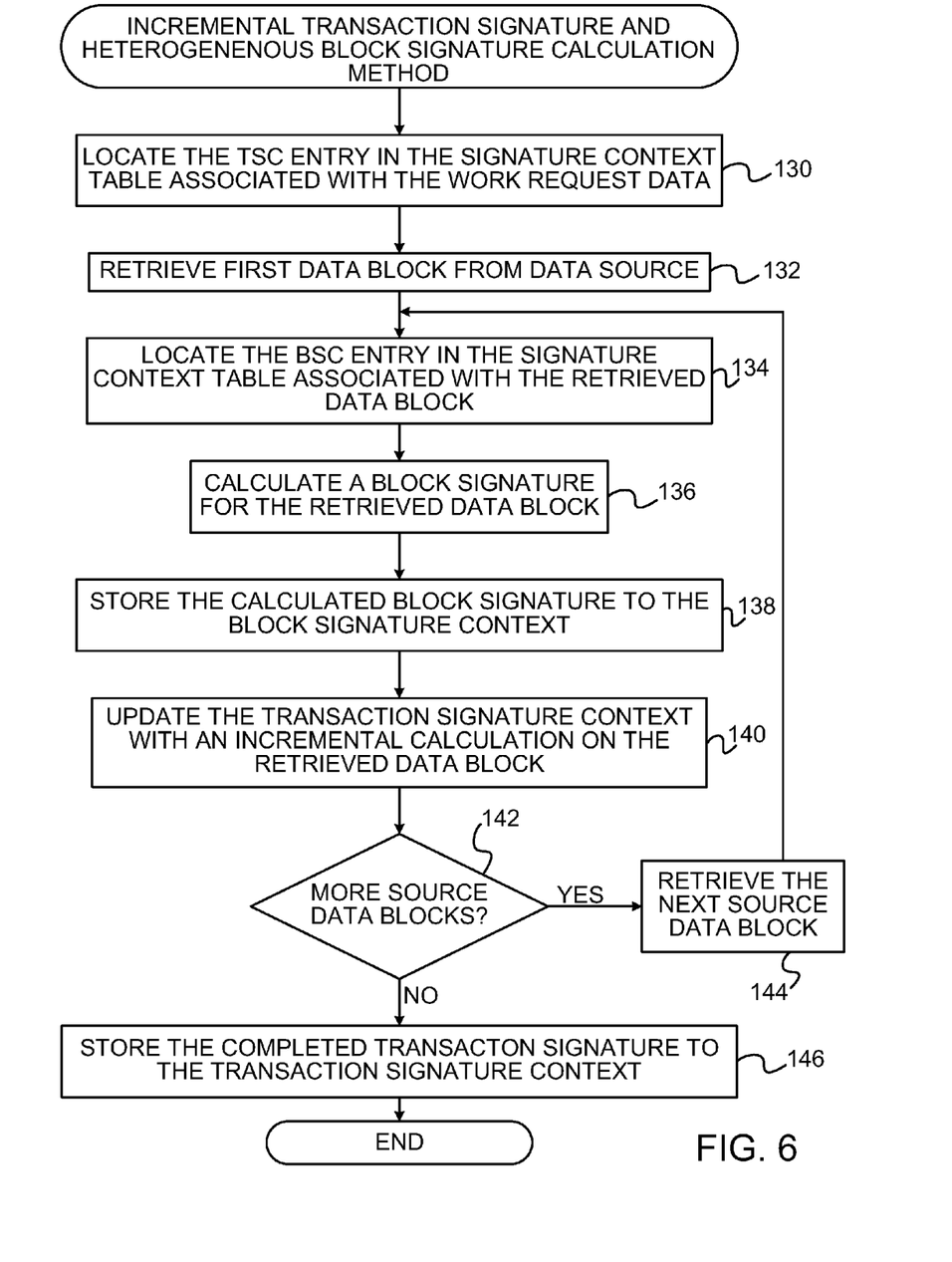
FIG. 6 is a flow diagram that schematically illustrates a signature calculation method, in accordance with an embodiment of the present invention.

If the executing transaction requires new signatures to be computed for data transmission (step 116), then signature context module 56 performs the necessary steps. These steps may include removing the verified signatures from the data (step 118) if necessary. Module 56 then computes new block and/or transaction signatures for insertion in the outgoing packets (step 120). (Details of this step are shown in FIG. 6.) HCA 22 then transmits the transaction data blocks with the computed block and/or transaction signatures to the data destination on network 46 via network interface 54 (step 122).

If, however, no new block or transaction signature is to be computed (step 112), then HCA 22 transmits the transaction data blocks, with or without the verified block and/or transaction signatures, to the data destination on network 46 via network interface 54 without additional signature computation (step 124).

Circuitry 50 then generates a completion report to host CPU 42 that includes, if required, the results of verification of the retrieved signatures (step 126). The completion report comprises information on the calculated block and transaction signatures, including indication of any detected block signature or transaction signature errors. Signature context module 56 stores any detected errors in their respective fields in signature context table 62. Signature context module 56 marks any entries in these tables which experienced an error during the work request as "poisoned." Software executing on host CPU 42 can then query the signature context tables. Alternatively or additionally, signature context module 56 conveys the completion report to host processor 42 via host interface 48.

The signature processing method described hereinabove can also be performed in the opposite direction. In this case, data blocks arrive from network 46 via network interface 54. Signature context module 56 may then verify the source signatures, remove the source signatures, generate a completion report and compute the destination signatures, as required by the rules in the signature context. DMA module 60 then stores the data blocks and the verified/recomputed signatures to host memory 44 via host interface 48.

In some embodiments of the present invention, the source data blocks may be of different sizes (and boundaries) from the destination data blocks. In cases of signature handover, as noted above, there may be two signature calculations on each block: one to verify the incoming signature and another to generate a new signature for output with the data.

Thus, in some embodiments of the present invention, HCA 22 executes a signature operation between two protection domains, internal (i.e., system memory) and external (i.e., a network). The signature operation can occur while HCA 22 executes a transaction (i.e., transferring a data structure) between the two domains, wherein one is homogenous and the other is heterogeneous. The data structure in a homogeneous protection domain is constructed of data blocks of the same size and same signature rules, while data blocks in heterogeneous protection domain can be of different sizes and use different signature rules. In addition, as noted earlier, a data structure in either of the domains can contain "opaque" segment of data of arbitrary size, meaning a block or blocks that are not protected by a block-level signature.

A protection domain can either be the source or the destination of a signature transaction, and each domain can be either in host memory 44 or on network 46. HCA 22 supports signature operations for both send/receive and RDMA (read and write) operations on both the requestor and the responder sides of transactions. In general, contiguous segments of signature-protected blocks in one domain contain a first integer number of data blocks and fit into a second integer number of data blocks in the other domain. In transition from a heterogeneous to a homogeneous protection domain, HCA 22 adds the necessary padding to complement the segment to fit in the second integer number of blocks in the homogenous protection domain. Normally, padding is signature-invariant in a homogeneous protection domain (e.g. zeros for XOR or checksum).

In some embodiments of the present invention, HCA 22 executes the signature-related operations described above at wire speed. Processing circuitry 50 calculates both old and new signatures while data flows through HCA 22, and the signature is replaced only if the old signature is valid. If the signature check fails, then the operation is with an error, which will be reported upon completion of the work request.

FIG. 6 is a flow diagram that schematically illustrates an incremental signature calculation method, in accordance with an embodiment of the present invention. This method may be carried out, for example, at step 120 in the method of FIG. 5. To illustrate an example work request, the following description of the method of FIG. 6 refers specifically to input data 72 and the other data structures shown in FIG. 3. When HCA 22 receives a work request, the work request also includes the memory key or keys for the data blocks to be transferred, for example, the memory key with identifier MKEY2 in FIG. 3.

First, address translation module 58 uses the work request memory keys to look up the TSC entry in signature context table 62 associated with the data blocks to be transferred (step 130). Once the TSC is located, address translation module 58 refers to memory translation table 68 to determine the physical address of data blocks 72 in host memory 44. DMA module 60 retrieves the first data block (data block 78 in the example of FIG. 3) from the physical memory address provided by address translation module 58 in host memory 44, via host interface 48 (step 132).

Signature context module 56 then locates the BSC entry in signature context table 62 associated with the retrieved data block (step 134). To locate the block and signature context table entries, address translation module 58 looks up memory key MKEY2 in memory protection table 66. In this example, the memory protection table entry for MKEY2 comprises a pointer to a TSC entry in signature context table 62 with an identifier of TSC1, followed by a BSC entry with an identifier of BSC1. Aside from the identifier (i.e., BSC1), the BSC entry comprises the block signature rule, and the block signature result. The TSC1 entry in signature context table 62 comprises a transaction signature rule and a transaction signature result. Address translation module 58 then passes the pointers to the BSC1 and TSC1 signature context table entries to signature context module 56.

Using the block signature rule stored in the BSC entry BSC1, signature context module 56 calculates the block signature for the retrieved data block (step 136) and stores the calculated block signature to the result field associated with block signature BSC1 (step 128). This result will be transmitted in a transaction data packet together with the data block (step 122, FIG. 5). Signature context module 56 also updates the result field of signature context table 62 entry TSC1 with an incremental transaction signature value (i.e., calculated on the retrieved data block), in accordance with the transaction signature rule for signature context table 62 entry TSC1 (step 140).

If there are more data blocks to be retrieved (step 142), DMA module 60 reads the next data block in input data 72 from host memory 44 via host interface 48 (step 144) and the method returns to step 134. Otherwise, signature context module 56 completes calculation of the transaction signature (i.e., after processing the final data block in input data 72 and calculating the final increment of the transaction signature), and stores the calculated transaction signature to signature context table 62 entry TSC1 (step 146). This transaction signature will typically be transmitted in the final data packet of the transaction.

While the flow diagram schematically illustrated in FIG. 6 describes a transaction comprising data blocks covered by both heterogeneous block signatures and a transaction signature, embodiments of the present invention include other scenarios. For example, a transaction may comprise homogeneous block signatures, or data blocks covered solely by a transaction signature (i.e., no block signatures), or data blocks covered solely by (homogeneous or heterogeneous) block signatures (i.e., no transaction signature). When the transaction comprises data blocks covered by homogeneous block signatures, after retrieving the next data block (step 144), the method described in FIG. 6 continues with step 146, since there is no need to locate a BSC table entry when retrieving each data block.

While processing a given transaction, HCA 22 takes "ownership" of the required entries in signature context table 62. These parameters are passed to hardware ownership when the transaction is initiated (e.g., when the request for the first I/O operation is posted on host interface 48), and they are owned by the hardware until the transaction is completed. Signature calculation results (i.e., signature calculation and error reporting) are stored in their respective tables upon completion of the transaction, thereby enabling the results to be queried by software and/or re-used for subsequent transactions.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limiting to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

The invention claimed is:

1. A network communication device, comprising:
   a host interface, which is coupled to communicate with a host processor so as to receive a work request to execute a transaction in which data are transferred over a packet network;
   a network interface, coupled to the packet network; and
   processing circuitry, which is configured to process one or more data packets containing the data so as to execute the transaction subject to a signature that is defined over an integer number of data blocks of a given size, and which is configured to pad the data in order to fit the integer number of the data blocks, and to compute the signature over the padded data.

2. The device according to claim 1, wherein the processing circuitry is configured to pad the data with padding that is signature-invariant with respect to the defined signature.

3. The device according to claim 1, wherein the processing circuitry is configured to receive the data from a heterogeneous protection domain, in which different data blocks may have different sizes, and to pad the data for transmission in a homogeneous protection domain, in which all the data blocks have the same size.

4. The device according to claim 1, and comprising a control memory, which is configured to store a signature context specifying a definition of the signature for the transaction, wherein the processing circuitry is configured to read and apply the signature context in order to compute the signature.

5. The device according to claim 1, wherein the data are received by the processing circuitry with a first signature, and the processing circuitry is configured to remove, read and verify the first signature, to pad the data after removing the first signature, and to compute and append a second signature, different from the first signature, to the integer number of the data blocks that contain the padded data.

6. A method for communication, comprising:

receiving a work request from a host processor to execute a transaction in which data are transferred, subject to a signature that is defined over an integer number of data blocks of a given size, over a packet network via a network interface device;

padding the data in the network interface device in order to fit the integer number of the data blocks;

computing the signature in the network interface device over the padded data; and processing, in the network interface device, one or more data packets containing the data with the signature so as to execute the transaction.

7. The method according to claim 6, wherein the padding the data comprises appending to the data padding that is signature-invariant with respect to the defined signature.

8. The method according to claim 6, wherein processing the one or more data packets comprises receiving the data from a heterogeneous protection domain, in which different data blocks may have different sizes, and wherein padding the data comprises preparing the data for transmission in a homogeneous protection domain, in which all the data blocks have the same size.

9. The method according to claim 6, and comprising reading a definition of the signature for the transaction from a signature context stored in a control memory, wherein the data are padded and the signature is computed in accordance with the definition in the signature context.

10. The method according to claim 6, wherein processing the one or more data packets comprises receiving the data with a first signature, verifying the first signature, and removing the first signature from the data, and wherein the data are padded after removing the first signature, and wherein computing the signature comprises computing and appending a second signature, different from the first signature, to the integer number of the data blocks that contain the padded data.

* * * * *